US012651439B2

(12) United States Patent
Moon et al.

(10) Patent No.: US 12,651,439 B2
(45) Date of Patent: Jun. 9, 2026

(54) METHOD AND APPARATUS WITH NEURAL NETWORK MODEL FOR SCENE REPRESENTATION

(71) Applicant: Samsung Electronics Co., Ltd., Suwon-si (KR)

(72) Inventors: Hyewon Moon, Suwon-si (KR); Nahyup Kang, Suwon-si (KR); Jiyeon Kim, Suwon-si (KR); Donghoon Sagong, Suwon-si (KR); Seokhwan Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 306 days.

(21) Appl. No.: 18/350,311

(22) Filed: Jul. 11, 2023

(65) Prior Publication Data

US 2024/0257503 A1    Aug. 1, 2024

(30) Foreign Application Priority Data

Jan. 26, 2023    (KR) ........................ 10-2023-0010021

(51) Int. Cl.
| | |
|---|---|
| *G06V 10/774* | (2022.01) |
| *G06T 7/50* | (2017.01) |
| *G06T 7/70* | (2017.01) |
| *G06T 7/90* | (2017.01) |
| *G06T 17/00* | (2006.01) |
| *G06V 10/82* | (2022.01) |

(52) U.S. Cl.
CPC .............. G06V 10/774 (2022.01); G06T 7/50 (2017.01); G06T 7/70 (2017.01); G06T 7/90 (2017.01);
(Continued)

(58) Field of Classification Search
CPC ........ G06V 10/774; G06V 10/82; G06T 7/50; G06T 7/70; G06T 7/90; G06T 17/00;
(Continued)

(56) References Cited

U.S. PATENT DOCUMENTS

| | | |
|---|---|---|
| 10,706,582 B2 | 7/2020 | Chandraker et al. |
| 11,250,613 B2 | 2/2022 | Abramov |

(Continued)

FOREIGN PATENT DOCUMENTS

| | | | | |
|---|---|---|---|---|
| WO | WO-2022195282 A1 * | 9/2022 | ............. | G06T 17/00 |
| WO | WO-2022198684 A1 * | 9/2022 | ........... | G06T 15/506 |

OTHER PUBLICATIONS

Liu et al.: "Neural Sparse Voxel Fields", Arxiv.org Cornell University Library, submitted Jul. 22, 2020, [retrieved on Sep. 26, 2025]. Retrieved from the internet <https://arxiv.org/abs/2007.11571> (Year: 2020).*

(Continued)

*Primary Examiner* — Edward Park
*Assistant Examiner* — Alexander Joseph Vaughn
(74) *Attorney, Agent, or Firm* — Sughrue Mion, PLLC

(57)    ABSTRACT

An image processing method and an image processing apparatus are provided. The image processing method includes: receiving a camera pose of a camera corresponding to a target scene; generating a piece of prediction information including either a color of an object included in the target scene or a density of the object, wherein the prediction information is generated by applying, to a neural network model, three-dimensional (3D) points on a camera ray formed based on the camera pose; sampling, among the 3D points, target points corresponding to a static object, wherein the sampling is based on the piece of prediction information; and outputting a rendered image corresponding to the target scene by projecting a pixel value corresponding to the target points onto the target scene and rendering the target scene onto which the pixel value may be projected.

20 Claims, 12 Drawing Sheets

(52) U.S. Cl.
CPC .............. *G06T 17/00* (2013.01); *G06V 10/82* (2022.01); *G06T 2207/30244* (2013.01)

(58) Field of Classification Search
CPC ........... G06T 2207/30244; G06T 11/00; G06T 15/08; G06T 15/20; G06T 5/50; G06T 15/04; G06T 15/06; G06T 15/10; G06T 2207/20081; G06T 2207/20084; G06T 2207/20221; G06N 3/08
See application file for complete search history.

(56) References Cited

U.S. PATENT DOCUMENTS

| | | | |
|---|---|---|---|
| 11,308,659 | B2 | 4/2022 | Duckworth et al. |
| 2022/0036602 | A1* | 2/2022 | Duckworth ............... G06T 7/90 |
| 2022/0237834 | A1 | 7/2022 | Duckworth et al. |
| 2022/0239844 | A1 | 7/2022 | Lv et al. |
| 2022/0292781 | A1 | 9/2022 | Bautista Martin et al. |
| 2022/0301252 | A1* | 9/2022 | Wang .................... G06T 15/506 |
| 2022/0301257 | A1 | 9/2022 | Garbin et al. |
| 2022/0327767 | A1 | 10/2022 | He et al. |

OTHER PUBLICATIONS

Mildenhall, Ben, et al. "Nerf: Representing scenes as neural radiance fields for view synthesis." *Communications of the ACM* 65.1 (2021): pp. 99-106.
Martin-Brualla, Ricardo, et al. "Nerf in the wild: Neural radiance fields for unconstrained photo collections." *Proceedings of the IEEE/CVF Conference on Computer Vision and Pattern Recognition*. 2021.

* cited by examiner

300

310     320     330

340     350     360

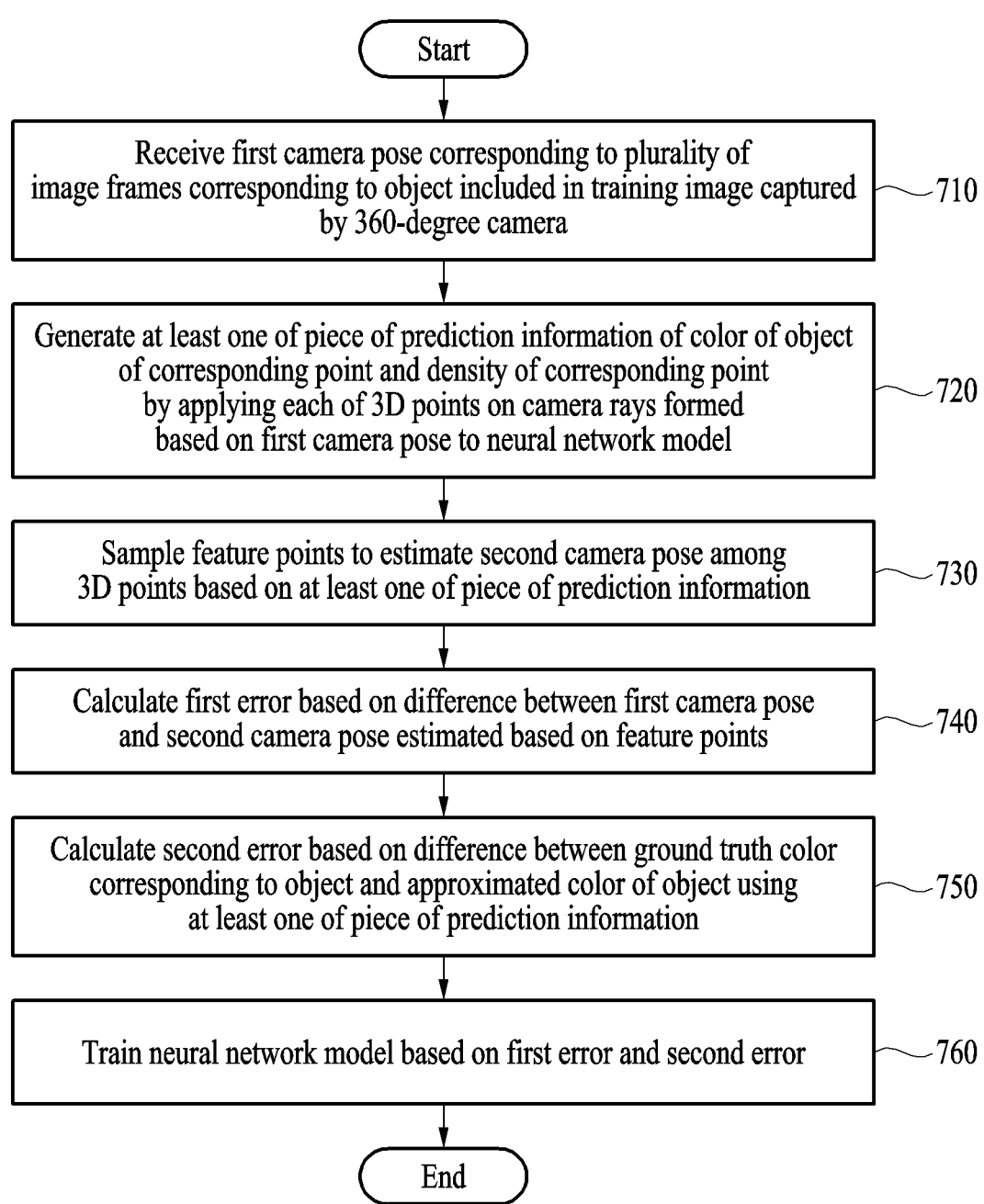

Start

Receive first camera pose corresponding to plurality of
image frames corresponding to object included in training image captured
by 360-degree camera — 710

Generate at least one of piece of prediction information of color of object
of corresponding point and density of corresponding point
by applying each of 3D points on camera rays formed
based on first camera pose to neural network model — 720

Sample feature points to estimate second camera pose among
3D points based on at least one of piece of prediction information — 730

Calculate first error based on difference between first camera pose
and second camera pose estimated based on feature points — 740

Calculate second error based on difference between ground truth color
corresponding to object and approximated color of object using
at least one of piece of prediction information — 750

Train neural network model based on first error and second error — 760

End

FIG. 7

METHOD AND APPARATUS WITH NEURAL NETWORK MODEL FOR SCENE REPRESENTATION

CROSS-REFERENCE TO RELATED APPLICATIONS

This application claims the benefit under 35 USC § 119(a) of Korean Patent Application No. 10-2023-0010021, filed on Jan. 26, 2023, in the Korean Intellectual Property Office, the entire disclosure of which is incorporated herein by reference for all purposes.

BACKGROUND

1. Field

The following description relates to representing a scene using view synthesis and a method of training a neural network model for representing a scene.

2. Description of Related Art

View synthesis is a technique that trains a neural network with information on a predetermined scene by using images obtained for a predetermined scene and camera information, such as camera poses of the images, as a training set. When a new camera view that is not included in the training set is given, the trained neural network can generate a synthetic image representing the predetermined scene as captured/ seen from the camera view (the new camera view). In sum, the neural network may be trained to generate two-dimensional (2D) images viewed from arbitrary camera views by rendering a three-dimensional (3D) model based on the arbitrary camera views, where the 3D model is generated in correspondence with various camera views.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing method includes: receiving a camera pose of a camera corresponding to a target scene; generating a piece of prediction information including either a color of an object included in the target scene or a density of the object, wherein the prediction information is generated by applying, to a neural network model, three-dimensional (3D) points on a camera ray formed based on the camera pose; sampling, among the 3D points, target points corresponding to a static object, wherein the sampling is based on the piece of prediction information; and outputting a rendered image corresponding to the target scene by projecting a pixel value corresponding to the target points onto the target scene and rendering the target scene onto which the pixel value may be projected.

The generating of the piece of prediction information may include applying a first latent vector denoting appearance information of the static object to the neural network model.

The sampling of the target points may include: based on the density of the object, setting, to be the target points, those of the 3D points that correspond to the static object and that have respective density values greater than a reference value.

The sampling of the target points may include: based on the density of the object, setting, to be the target points, (i) those of the 3D points that correspond to the static object and that have respective density values greater than a reference value among the 3D points and (ii) those of the 3D points that are adjacent to the 3D points having density values greater than the reference value.

The sampling of the target points may include sampling the target points among the 3D points based on a combination of the density of the object and a probability that the object corresponds to a transient object in the scene.

The sampling of the target points may include setting, to be the target points, those of the 3D points for which accumulated transmittance thereof exceeds a threshold.

The camera pose may include: positions of the 3D points on camera rays passing from a center of the camera and through pixels of the target scene; a position of the camera viewing the 3D points for each of the camera rays; and a direction in which the camera views the 3D points.

The neural network model may be trained to output, as a target scene and a camera pose are input to the neural network model, a color of a pixel related to a 3D point, a density corresponding to the 3D point, and a probability that the 3D point corresponds to a transient object, wherein the 3D point may be a 3D point, among the 3D points in the target scene, that corresponds to the object.

The outputting of the rendered image may further include: projecting, onto the target scene, a color of a pixel corresponding to the camera ray and a density determined for each position of the target points, and rendering the target scene onto which the density and the color of the pixel may be projected, wherein the color of the pixel and the density may be determined by applying each position of the target points to the neural network model.

The outputting of the rendered image may include: iteratively projecting, onto the target scene, a color of a pixel determined for each position of the target points and a density determined for each position of the target points, and rendering the target scene onto which the density and the color of the pixel may be iteratively projected.

In another general aspect, a method of training a neural network model for image processing includes: receiving a first camera pose corresponding to each of image frames corresponding to an object included in a training image captured by a 360-degree camera; generating at least one piece of prediction information of a color of the 3D corresponding point and a density of the 3D point by applying, to the neural network model, each three-dimensional (3D) point on camera rays formed based on the first camera pose; sampling feature points to estimate a second camera pose, wherein the feature points are sampled from among the 3D points based on a piece of prediction information; calculating a first error based on a difference between the first camera pose and the second camera pose; calculating a second error based on a difference between a ground truth color corresponding to the object and an approximated color of the object that may be approximated using the piece of prediction information; and training the neural network model based on the first error and the second error.

The piece of prediction information may include a probability that the object corresponds a transient object, a second color corresponding to the transient object at the 3D point, and a second density corresponding to the transient object at the 3D point.

The sampling of the feature points may be based on a combination of the density of the 3D point and a probability that the 3D point corresponds to a transient object.

The sampling of the feature points may include: based on a density of the corresponding point, sampling, as the feature points, either: a 3D point having a greatest density value among the 3D points, 3D points having greater density values than a reference value among the 3D points, and/or 3D points adjacent to 3D points having greater density values than the reference value.

The sampling of the feature points may include setting, to be the feature points, 3D points of which accumulated transmittance of the 3D points exceeds a predetermined threshold.

The generating of the at least one piece of prediction information may include applying, to the neural network model, a first latent vector denoting appearance information of a static object of the object and/or a second latent vector denoting appearance information of the transient object of the object.

The training may include training the first latent vector together with the neural network model based on the first error and the second error.

The method may further include adjusting the first camera pose based on the first error and the second error.

A non-transitory computer-readable storage medium may store instructions that, when executed by a processor, cause the processor to perform any of the methods.

In another general aspect, an image processing apparatus includes: one or more processors; memory storing instructions configured to cause the one or more processors to: generate a piece of prediction information predicting a color of an object included in a target scene or a density of the object, wherein the piece of prediction information is generated by applying, to a neural network, three-dimensional (3D) points on a camera ray formed based on a camera pose, sample target points corresponding to a static object among the 3D points based on the piece of prediction information, and output a rendered image corresponding to the target scene by projecting a pixel value corresponding to the target points onto the target scene and rendering the target scene onto which the pixel value may be projected Other features and aspects will be apparent from the following detailed description, the drawings, and the claims.

BRIEF DESCRIPTION OF THE DRAWINGS

FIG. 7 illustrates an example method of training a neural network model, according to one or more embodiments.

Figure 1:
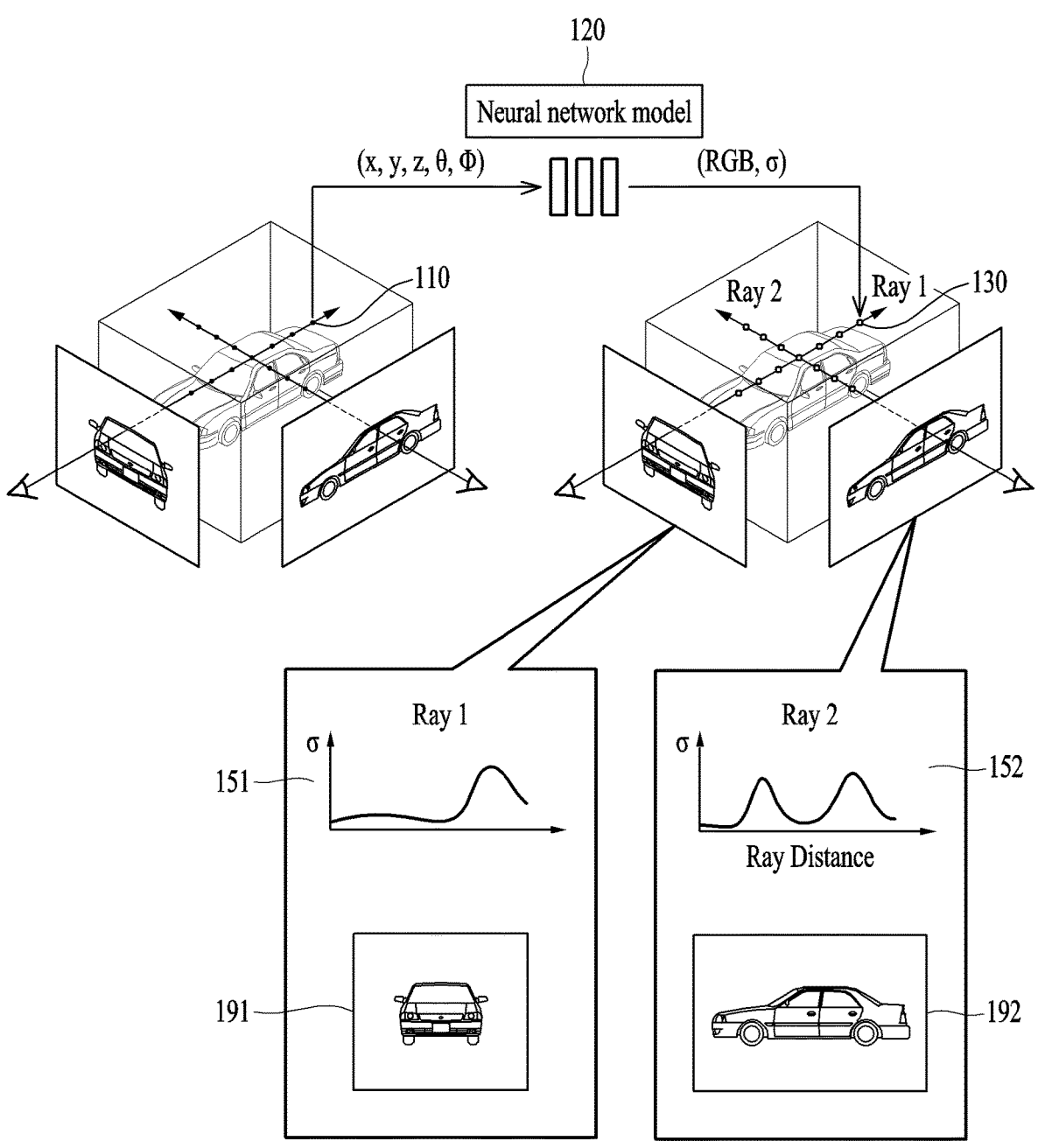
FIG. 1 illustrates an example of scene representation, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of scene representation, according to one or more embodiments. Referring to FIG. 1, illustrated is an example of view representation by view synthesis.

An image processing apparatus according to an example may generate or render a two-dimensional (2D) image representing a target scene (e.g., a 2D scene) that is a view of a three-dimensional (3D) space from an arbitrary viewpoint at an arbitrary field of view (FOV). The viewpoint may be, for example, a position where a camera (e.g., a virtual camera) having an arbitrary FOV captures a scene corresponding to a 2D image. In this case, a pixel value of each pixel included in the 2D image may be determined based on scene information of 3D points in a viewing direction corresponding to a corresponding pixel from a viewpoint. Hereinafter, a 3D point may be simply referred to as a "point".

The viewing direction may be a direction toward a pixel from a viewpoint. The viewing direction represents a direction (e.g., Ray 1 or Ray 2 of FIG. 1) passing through a pixel and/or a point corresponding to the pixel from a viewpoint facing a 2D scene to be synthesized.

The scene information may be data representing an element of a target scene in which a target point in a 3D space is viewed in a viewing direction at a predetermined time point and may include, for example, prediction information 130 related to neural scene representation (hereinafter, referred to as NSR). The prediction information 130 may include, for example, a color of an object included in a target scene and/or the density of the object. However, the example is not limited thereto.

Points in a 3D space may be expressed by the prediction information 130. The prediction information 130 may include, for example, neural radiance field (NeRF) data or NeRF in the wild (NeRF-W) data. However, the example is not limited thereto. The prediction information 130 may include color information and density information for each point in the 3D space. The color information may include color values according to a color space (e.g., a red value, a green value, and a blue value according to an RGB color space). The density information may correspond to a volume density $\sigma$. The volume density $\sigma$ of a given point may be interpreted as the possibility (e.g., differential probability) that a ray ends at an infinitesimal particle of the corresponding point. Hereinafter, the term "density" may be understood to indicate volume density without an additional description.

Although described later, a color value (e.g., an RGB value) of a target point may depend on a viewing direction and the volume density $\sigma$ may be independent of the viewing direction. However, the prediction information 130 is not limited to the above description and may vary depending on the design.

Referring to FIG. 1, the image processing apparatus may generate the prediction information 130 corresponding to a point by applying a query input 110 corresponding to each 3D point in a 3D space to a neural network model 120. The neural network model 120 may be a module designed and trained to output the prediction information 130 from the query input 110 and may include, for example, a neural network. In this case, the query input 110 corresponding to each point may include a viewing direction ($\theta$, $\phi$) and position coordinates (x, y, z) representing a corresponding position in the 3D space.

For example, the position coordinates may correspond to position coordinates (x, y, z) of 3D points on camera rays passing from the center of a camera through pixels of a target scene. In addition, the viewing direction may include a first direction $\theta$ (e.g., altitude) and a second direction $\phi$ (e.g., azimuth) in which the camera views the 3D points.

In FIG. 1, as an example of the query input 110, 5 degree of freedom (DoF) including position coordinates (x, y, z) and the viewing direction ($\theta$, $\phi$) is illustrated. For example, the position coordinates (x, y, z) may correspond to position coordinates complying with the cartesian coordinate system based on a predetermined origin point. The viewing direction ($\theta$, $\phi$) may respectively represent angles formed between the viewing direction ($\theta$, $\phi$) and two reference axes (e.g., a positive direction of the z-axis and a positive direction of the x-axis).

The prediction information 130 may be data representing views a scene in 3D space in various viewing directions. The prediction information 130 may include, for each viewing direction, a point of a 3D space and color information and density information.

In graphs 151 and 152 representing the volume density $\sigma$ of FIG. 1, the horizontal axis represents a distance from a corresponding viewpoint in a corresponding viewing direction and the vertical axis represents a value of volume density as a function of the distance. In this case, a color value (e.g., an RGB value) may also be determined according to the ray distance in the viewing direction. However, the prediction information 130 is not limited to the above description and may vary depending on the design.

A neural network of the neural network model 120 for generating the prediction information 130 may have, for example, a multi-layer perceptron (MLP) structure. However, the example is not limited thereto. The neural network may be trained to output (color (an RGB value), volume density $\sigma$) of a corresponding point with respect to input data (e.g., a 5DoF camera pose (x, y, z, $\theta$, $\phi$)).

For example, a viewing direction may be defined for each pixel of 2D scene images (e.g., a 2D scene image 191 and a 2D scene image 192), and output values (e.g., the prediction information 130) of all sampled points in the viewing direction may be calculated through an operation of the neural network. FIG. 1 shows the 2D scene image 191 of a view of an object (e.g., a vehicle) from the front and the 2D scene image 192 of a view of the object from the side.

The image processing apparatus may generate a rendered image with a photorealistic level of quality, with the rendered image corresponding to a target scene viewing a 3D space built by the prediction information 130 at a predetermined new viewpoint.

The neural network model 120 may be a neural network trained to output an RGB color and the volume density σ of a pixel related to a point corresponding to 5DoF position coordinates (e.g., a 5DoF camera pose (x, y, z, θ, φ) in an image. In this case, the volume density σ represents contribution of the corresponding pixel. For example, as a volume density value increases, the contribution of the corresponding pixel may increase and as the volume density value decreases, the contribution of the corresponding pixel may decrease.

Alternatively, the neural network model 120 may be a neural network trained to output an RGB color and volume density of a pixel related to a point corresponding to 6D position coordinates (e.g., a first latent vector denoting appearance information of a static object and a 5DoF camera pose (x, y, z, θ, φ)) in an image.

For example, the neural network model 120 may query 5D position coordinates or 6D position coordinates following camera rays, such as Ray 1 and/or Ray 2, and may synthesize a target scene by projecting a color and the volume density to an image using a volume rendering technique. In this case, to optimize views, the neural network model 120 may be trained using, as input, a set of images having known respective camera poses. The image set may include, for example, a ground truth (e.g., g) pixel value corresponding to camera poses of a plurality of image frames corresponding to an object included in a training image captured by a 360-degree camera.

For example, a training apparatus may train the neural network model 120 to minimize the difference between a ground truth pixel value and a result value obtained by accumulating pixel values corresponding to points sampled on camera rays, such as Ray 1 and/or Ray 2, until the camera rays reach a point on an image plane. The 3D points sampled on the camera ray are shown as dots • in FIG. 1.

Figure 2:
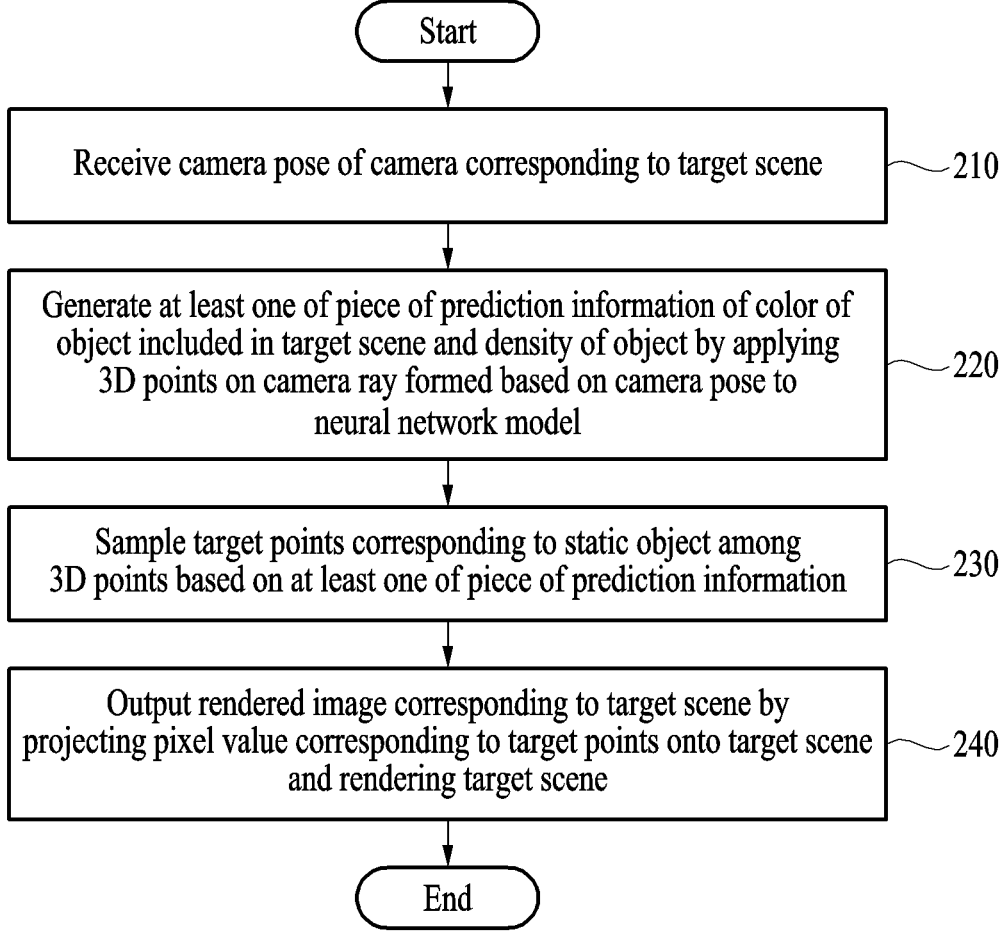
FIG. 2 illustrates an example image processing method for scene representation, according to one or more embodiments.

FIG. 2 illustrates an example image processing method for scene representation, according to one or more embodiments.

Referring to FIG. 2, an image processing apparatus may output a rendered image through operations 210 to 240.

In operation 210, the image processing apparatus may receive a camera pose of a camera corresponding to a target scene. The target scene may be a scene of viewing a 3D space from an arbitrary viewpoint at an arbitrary FOV at an arbitrary time point. The camera pose may include, for example, positions (x, y, z) of 3D points on camera rays passing through pixels of an input image from the center of a camera and a viewing direction including a position θ in which a camera views the 3D points for each camera ray and a direction φ in which the camera views the 3D points. The camera pose received in operation 210 may be a ground truth camera pose corresponding to a target image.

In operation 220, the image processing apparatus may generate at least one of piece of prediction information of a color of an object included in a target scene and a density of the object by applying 3D points on a camera ray that is formed by inputting the camera pose (received in operation 210) to a neural network model. The image processing apparatus may infer at least one of piece of prediction information using at least one trained neural network model. The density may be a reciprocal of transparency. As a density value at a point increases, a color value of the point may be proportionally more reflected. The density represents a probability distribution for a region in which the object is located. The density (value) may be a value related to a position viewing an image and the color (value) may be a value related to a position as well as a viewing direction viewing an image.

Figure 4:
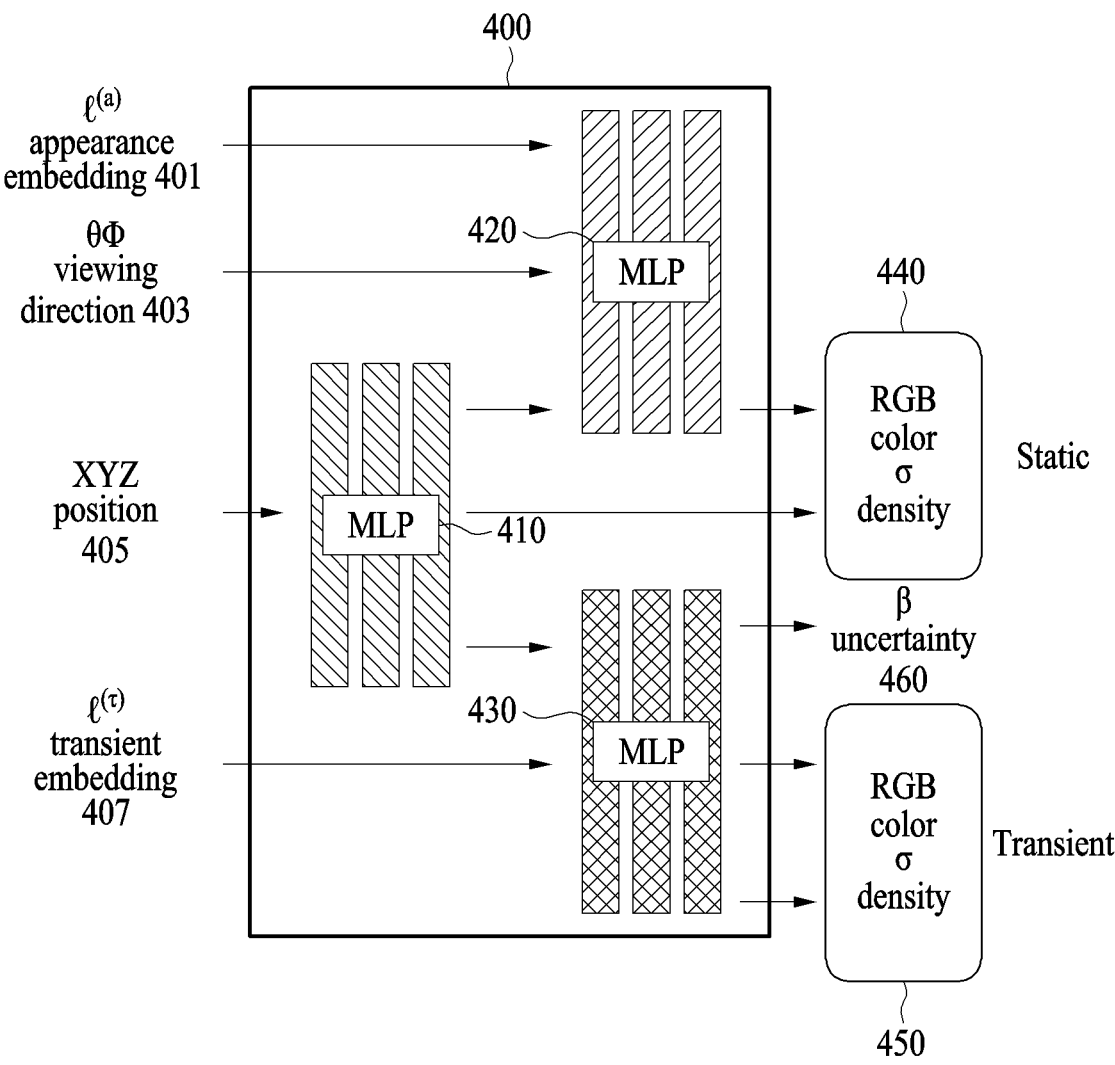
FIG. 4 illustrates an example neural network model, according to one or more embodiments.

For example, as a target scene and a camera pose are input to the neural network model, as shown in a neural network model 400 of FIG. 4, the neural network model may be trained to output a color of a pixel related to a 3D point, a density corresponding to the 3D point, and the probability in which the 3D point corresponds to a transient object (an object not always present in the scene), wherein the 3D point corresponds to an object among 3D points in a target scene. As shown in the neural network model 120 of FIG. 1, the neural network model may be, for example, trained to output an RGB value and volume density of a sample point for a camera pose of a camera corresponding to a target scene. For example, a viewing direction may be defined for each pixel of the 2D scene image 191 or 192 and output values (e.g., the prediction information 130) of all sample points in the viewing direction may be generated by the neural network model. The neural network model may have, for example, an MLP structure. However, the example is not limited thereto. Alternatively, the neural network model may be configured in multiple networks, as with the example neural network model 400 of FIG. 4. The structure and the training method of the neural network model are described with reference to FIGS. 4 to 7 and FIG. 9.

For example, when the neural network model is implemented as the neural network model 400 of FIG. 4, the image processing apparatus may generate at least one piece of prediction information by further applying a first latent vector, which denotes appearance information of a static object to the neural network model. The type of the object included in the target scene according to an example is described with reference to FIG. 3. In addition, the prediction information generated by the image processing apparatus is described with reference to FIG. 5.

In operation 230, the image processing apparatus may sample, among 3D points, target points corresponding to a static object, and may do so based on the at least one piece of prediction information generated in operation 220. Based on the density of the object, the image processing apparatus may set 3D points, which have density values greater than a reference value, and which correspond to the static object (among 3D points) to be the target points, which may then be sampled. Based on the density of the object, the image processing apparatus may set, to be target points, (i) 3D points having greater density values than a reference value, and/or (ii) 3D points adjacent to the 3D points having greater density values than the reference value. The image processing apparatus may sample the target points based on a combination of the density of the object and the probability ("uncertainty") that the object corresponds to a transient object. The image processing apparatus may sample the target points onto 3D points, which have greater density values than a reference value, corresponding to a static object (among 3D points) according to a result reflecting the probability that the object corresponds to a transient object. Alternatively, the image processing apparatus may set, to be the target points, 3D points of which accumulated transmittance of the 3D points exceeds a predetermined threshold. An example in which the image processing apparatus samples the target points is described with reference to FIGS. 8B and 8C.

In operation 240, the image processing apparatus may output a rendered image corresponding to the target scene by projecting, onto the target scene, pixel values corresponding to the sampling of the target points (sampled in operation 230) and then rendering the target scene.

The image processing apparatus may render the target scene by projecting, onto the target scene, a pixel value corresponding to a camera ray determined by applying each position of the target points to the neural network model. The image processing apparatus may output a rendered image corresponding to the target scene by iteratively projecting, onto the target scene, a color of a pixel determined for each position of the target points and a density determined for each position of the target points and rendering the target scene.

Figure 3:
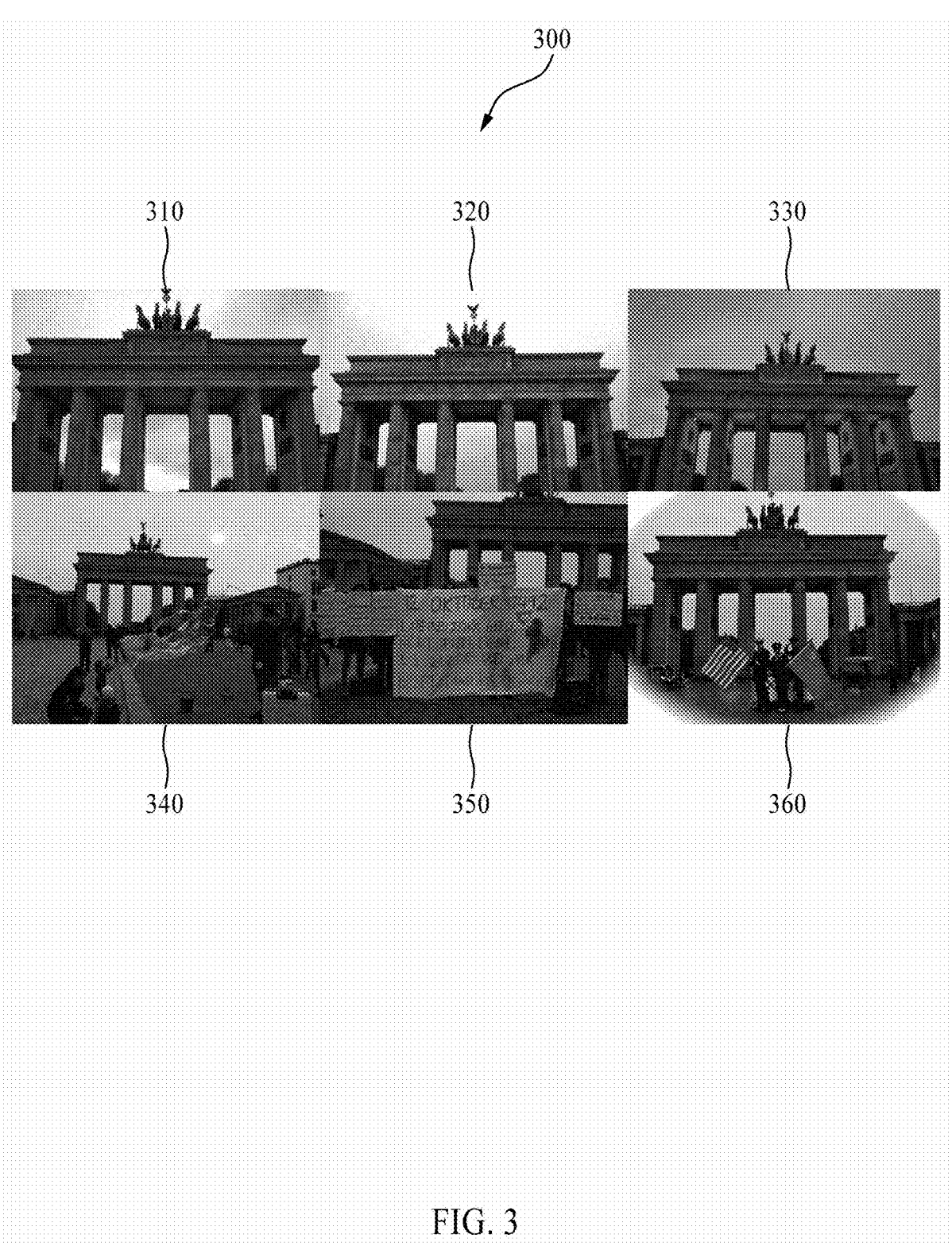
FIG. 3 illustrates an example object included in a target scene, according to one or more embodiments.

FIG. 3 illustrates an example object included in a target scene, according to one or more embodiments. Referring to FIG. 3, illustrated is a diagram 300 representing input images 310, 320, and 330 including a static object among objects included in a target scene and input images 340, 350, and 360 including a static object and a transient object.

The input images 310-360 are, in the example, images of the Brandenburg Gate in Germany. In this case, the input images 310-360 may include variable or transient objects, such as a tourist, a vehicle, a national flag, and an animal, which are temporarily included in images other than the Brandenburg Gate, which is a fixed building. In addition, even if the input images 310-360 are images capturing the Brandenburg gate at the same location, the images may vary depending on the captured season, time, and weather; the season, weather, position of the sun and/or clouds in the images may vary.

An object that does not change in all input images and continuously exists like a landmark, such as the Brandenburg Gate included in the input images 310-360, may be referred to as a static object. In addition, an object that is temporarily included in input images and disappears, such as a tourist, a vehicle, a national flag, and an animal in the input images 310-360, may be referred to as a transient or dynamic object.

In addition, even though the Brandenburg Gate is itself a static object, and even if it is captured at the same location, its representation in an input image may change depending on photometry that varies based on the season, time, and weather of the captured image. Such change may be referred to as photometric variation.

FIG. 4 illustrates an example neural network model, according to one or more embodiments. Referring to FIG. 4, illustrated is a structure of a neural network model 400 and a training method.

The neural network model 400 may include a first network 410, a second network 420, and a third network 430.

The neural network model 400 may receive, as input data, an appearance embedding vector 401, a viewing direction $(l^{(a)})$ 403, position coordinates (x,y,z) 405 of a 3D point, and a transient embedding vector 407.

In this case, the viewing direction $(\theta, \phi)$ may be simply expressed as the "viewing direction d". In addition, the position coordinates (x,y,z) may be simply expressed as position coordinates r(t).

The neural network model 400 may be trained to distinguish between a static object and a transient object included in a scene. The neural network model 400 may predict a color and density 440 of a static object included in the scene and a color and density 450 of a transient object, and a probability $\beta$ 460 that points included in the scene correspond to the transient object. In this case, the probability that points included in the scene correspond to the transient object may be referred to as uncertainty. Hereinafter, the expressions "probability that the points correspond to the transient object" and the "uncertainty" are used interchangeably.

The neural network model 400 may model a landmark (e.g., a building) that constantly appears in training images included in a training data set as a static model and may model an object that temporarily appears (e.g., not landmark) as a transient object. In this case, by inputting the appearance embedding vector $l^{(a)}$ 401 and the transient embedding vector $l^{(\tau)}$ 407 to the neural network model 400, photometric variation and geometric variation subordinately existing in the training image may be reflected in an output result of the neural network model 400. The appearance embedding vector $l^{(a)}$ 401 may be, for example, optimized through generative latent optimization.

In the neural network model 400, the first network 410 may output a latent vector x,y,z and a density corresponding to a static object by receiving the position coordinates z(t) 405 of a 3D point. The latent vector z(t) output by the first network 410 may be transmitted to the second network 420 and the third network 430. The second network 420 may output a color corresponding to the static object by receiving the appearance embedding vector $l^{(a)}$ 401, the viewing direction $(\theta,\phi)$ 403, and the latent vector z(t). During a model training process, the neural network model 400 may learn two embedding vectors together with a parameter of the neural network rather than learn two embedding vectors in advance.

The neural network model 400 may correspond to a first model in which the first network 410 and the second network 420 process the static object.

In addition, the neural network model 400 may correspond to a second model in which the first network 410 and the third network 430 process the transient object. The third network 430 may output the uncertainty 460, the color, and density 450, each corresponding to the transient object, and may do so by receiving, and performing inference on, the latent vector z(t) ((output by the first network 410) and the transient embedding vector $l^{(\tau)}$ 407. In other words, the first model may output color and density 440 corresponding to the static object, and the second model may output color and density 450 corresponding to the transient object. In addition, the third network 430 may output the uncertainty $\beta$ 460 representing the probability that the 3D point corresponds to a transient object.

The neural network model 400 may predict a color of a pixel corresponding to a 3D point in the target scene based on the color and density 440 corresponding to the static object and the color and density 450 corresponding to the transient object.

While training the neural network model 400, the first model that processes the static object and the second model that processes the transient object may be trained.

The neural network model 400 may be trained by distinguishing the static object from the transient object during the training process and, during a rendering process, the trained neural network model 400 may remove a portion corresponding to the transient object and generate a more realistic rendered image for a related portion corresponding to the static object.

The image processing apparatus may use an embedding technique such that the neural network model 400 is well adapted to images captured in various environments and light sources. The image processing apparatus may perform rendering by matching the latent vector z(t) to the input image and using the latent vector z(t), the appearance embedding vector $1^{(a)}$ 401, the position coordinates r(t), and the viewing direction (d) as inputs. The image processing apparatus may perform, for example, rendering through Equation 1 shown below.

$$\hat{C}_i(r) = \mathcal{R}(r, c_i, \sigma),$$ <div align="right">Equation 1</div>

$$c_i(t) = MLP_{\theta_2}\!\left(z(t), \gamma_d(d), \ell_i^{(a)}\right).$$

In this case, $\hat{C}_i(r)$ denotes a color of a pixel corresponding to a camera ray r. $c_i$ denotes a color or radiance of a static object included in a sampled i-th image. $\sigma$ denotes the density of the static object. $1_i^{(a)}$ denotes an appearance embedding vector corresponding to the i-th image. In this case, t denotes a value multiplied by a direction d added to the origin o of the camera ray (r) (e.g., r(t)=o+td). Accordingly, in Equation 1, r(t) may be a point on the camera ray. $c_i$(t) denotes a color value at the point r(t) when using the i-th image.

The image processing apparatus may cause the neural network model 400 to generate scene images in which different styles of images are mixed by interpolating embedding vectors (e.g., the appearance embedding vector $1^{(a)}$ 401) corresponding to different images.

Unlike the static object, because the transient object does not always exist in an image or a scene, the image processing apparatus may generate more realistic images by excluding a color of a pixel associated with the transient object through the uncertainty $\beta$ 460 output by the neural network model 400.

An image reflecting the color and density 440 corresponding to the static object output by the neural network model 400 and an image reflecting the color and density 450 corresponding to the transient object, and the uncertainty $\beta$ 460 are described with reference to FIG. 5.

When the neural network model 400 is configured in two model structures, which are the first model and the second model, the image processing apparatus may obtain a color $\hat{C}_i(r)$ of a pixel to train the neural network model 400 through a processor configured with instructions equivalent to, and succinctly described by, Equation 2 shown below.

$$\hat{C}_i(r) = \sum_{k=1}^{K} T_i(t_k)\!\left(\alpha(\sigma(t_k)\delta_k)c_i(t_k) + \alpha\!\left(\sigma_i^{(\tau)}(t_k)\delta_k\right)c_i^{(\tau)}(t_k)\right),$$ <div align="right">Equation 2</div>

$$\text{where } T_i(t_k) = \exp\!\left(-\sum_{k'=1}^{k-1}\!\left(\sigma(t_k') + \sigma_i^{(\tau)}(t_k')\right)\delta_k'\right).$$

In this case, $t_k$ denotes a k-th point on a camera ray. $c_i$ denotes a predicted color (an RGB value) of a static object included in the i-th image. $\sigma$ denotes the density of the static object. $\delta_k$ denotes the distance between adjacent samples. $c_i^{(\tau)}$ denotes a color of a transient object included in the i-th image. $\sigma_i^{(\tau)}$ denotes the density of the transient object included in the i-th image. In this case, $T_i$ denotes transmittance. The transmittance $T_i$ may correspond to a function in which the sum of density values from (i) a portion $t_n$ where the camera ray starts to (ii) a portion t that is currently viewed results as a negative exponent. The transmittance may reflect a concept that density values of sampled points before a point accumulate and as the accumulated density values increase, the following points are invisible.

In this case, the neural network model 400 (e.g., an MLP) may obtain, for example, a density $$\sigma_i^{(\tau)}(t)$$

of the transient object at a point on the camera ray, a $$c_i^{(\tau)}(t)$$

of the transient object, and a probability $\tilde{\beta}_i$ (t) that the point on the camera ray corresponds to the transient object as Equation 3 shown below.

$$\left[\sigma_i^{(\tau)}(t), c_i^{(\tau)}(t), \tilde{\beta}_i(t)\right] = MLP_{\theta_3}\!\left(z(t), \ell_i^{(\tau)}\right),$$ <div align="right">Equation 3</div>

$$\beta_i(t) = \beta_{min} + \log\!\left(1 + \exp(\tilde{\beta}_i(t))\right),$$

$\beta_i$(t) denotes a value representing the possibility (or the probability) that each point corresponds to a transient object. In this process, $\beta_{min}$ may correspond to an experimentally set parameter.

A color $C_i(r)$ of a pixel may be modeled by a normal distribution N having a mean and variance as Equation 4 shown below.

$$C_i(r) \sim N\!\left(\hat{C}_i(r), \beta_i(r)^2\right)$$ <div align="right">Equation 4</div>

In addition, when using the uncertainty $\beta_i(r)$, a loss function $L_i(r)$ with respect to the final prediction result of the neural network model may be expressed as Equation 5 shown below.

$$L_i(r) = \frac{\left\|C_i(r) - \hat{C}_i(r)\right\|_2^2}{2\beta_i(r)^2} + \frac{\log \beta_i(r)^2}{2} + \frac{\lambda_u}{K}\sum_{k=1}^{K}\sigma_i^{(\tau)}(t_k).$$ <div align="right">Equation 5</div>

For example, when the neural network model is trained with multiple training images, such as 800 or 1,000 training images, a color value of a pixel corresponding to a predetermined position (x, y, z) may slightly change, and thus, a mean Ci and a probability $\beta_i$(t) that each point corresponds to a transient object may be modeled. Through the probability $\beta_i$(t) that each point corresponds to a transient object, the uncertainty $\beta_i(r)$ corresponding to a camera ray may be measured. The uncertainty $\beta_i(r)$ corresponding to the camera ray may be obtained by the weighted sum of the probability $\beta_i$(t) that each point on the camera ray corresponds to a transient object.

In the first term $$\frac{\left\|C_i(r) - \hat{C}_i(r)\right\|_2^2}{2\beta_i(r)^2}$$

of Equation 5, as the uncertainty $\beta_i(r)$ increases, the influence of L2 loss on a predicted color and a ground truth color may decrease. On the other hand, in the first term $$\frac{\|C_i(r) - \hat{C}_i(r)\|_2^2}{2\beta_i(r)^2},$$

as the uncertainty $\beta_i(r)$ decreases, the influence of the L2 loss on the predicted color and the ground truth color may increase.

In Equation 5, the second term $$\frac{\log \beta_i(r)^2}{2}$$

may normalize the uncertainty $\beta_i(r)$ such that the uncertainty does not increase too much and the third term $$\frac{\lambda_u}{K} \sum_{k=1}^{K} \sigma_i^{(\tau)}(t_k)$$

may normalize the density of the transient object such that the density of the transient object does not increase too much.

During an inference process, only the first model (e.g., the first network 410 and the second network 420) that processes the static object, in other words, only a portion of the neural network model 400 other than a portion associated with the uncertainty and the transient object (e.g., the second model and the third network 430), may be used.

Depending on an example, the image processing apparatus may, for example, generate prediction information by a neural network model configured as the neural network model 120 of FIG. 1. In this case, 5DoF (e.g., position coordinates (x, y, z) and a viewing direction $(\theta, \phi)$) may be input to the neural network model and accordingly, the neural network model may (i) calculate a first error by considering only the density of a static object without considering the uncertainty 460, and (ii) may be trained according to the first error.

Figure 5:
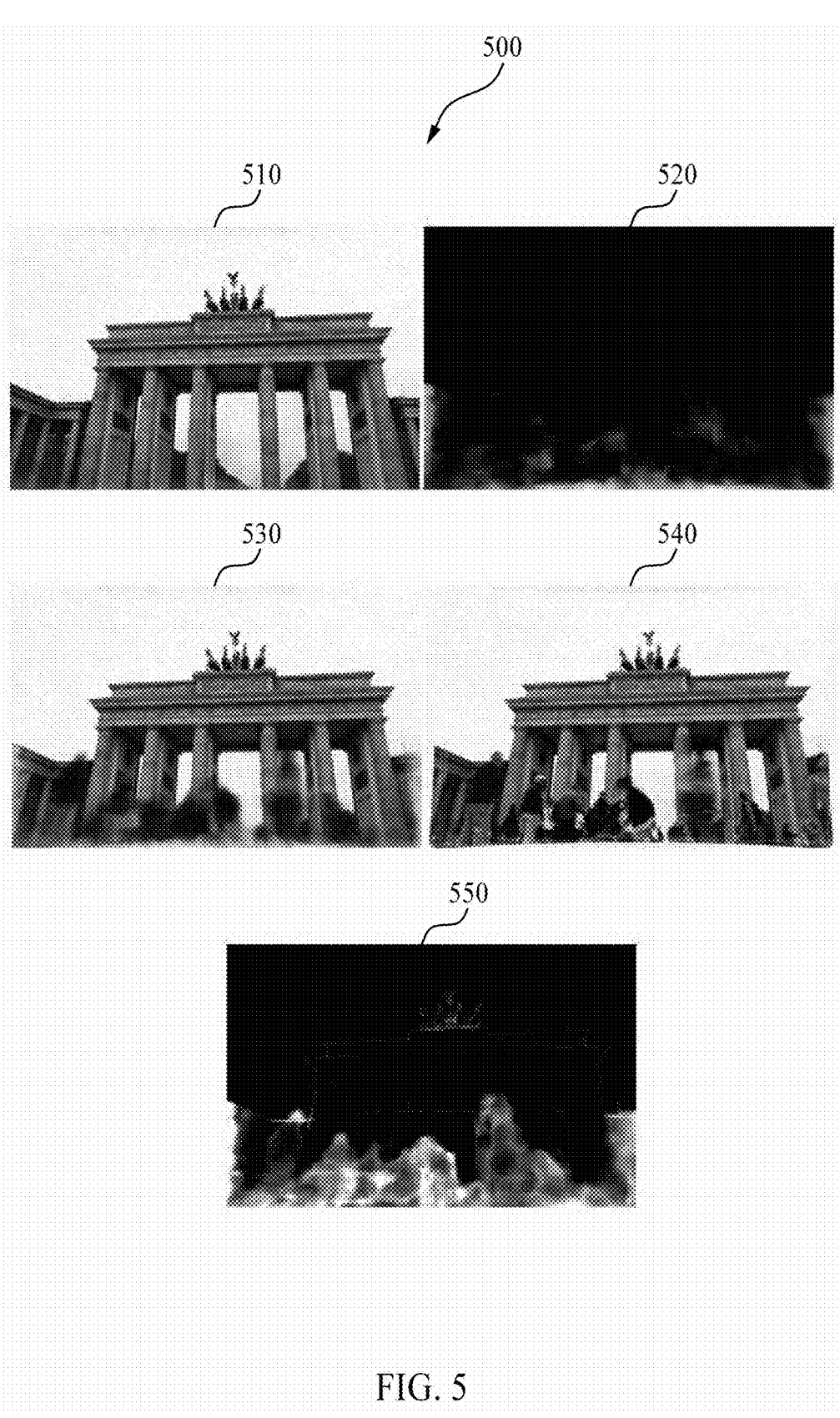
FIG. 5 illustrates example prediction information generated by a neural network model, according to one or more embodiments.

FIG. 5 illustrates an example of prediction information generated by a neural network model. Referring to FIG. 5, illustrated is a diagram 500 representing image data 510 corresponding to a static object generated by a neural network model, image data 520 corresponding to a transient object, an image 530 in which the image data 510 (corresponding to the static object) has been combined with the image data 520 (corresponding to the transient object, a ground truth image 540, and uncertainty data 550).

The image data 510 may correspond to an image portraying a color and density (e.g., the color and density 440 of the static object of FIG. 4) of a static object included in an image, wherein the color and density are predicted by the neural network model. In addition, the image data 520 may correspond to an image visualizing a color and density (e.g., the color and density 450 of the transient object of FIG. 4) of a transient object included in the image, wherein the color and density are predicted by the neural network model.

The image data 510 and the image data 520 may be generated while training the neural network model. A training apparatus may train the neural network model based on the difference between the ground truth image 540 and the image 530. The uncertainty data 550 may correspond to an image visualizing uncertainty predicted by the neural network model, where the uncertainty represents the probability of corresponding to a transient object, and where the probability is predicted by the neural network model. In this case, the uncertainty data 550 may be output while training the neural network model.

The image processing apparatus may generate a rendered image using the image data 510 during an inference process using the trained neural network model.

When the image processing apparatus calculates loss by comparing the ground truth image 540 with the image 530 combining the image data 510 with the image data 520, the image processing apparatus may assume that a portion with high uncertainty corresponds to the transient object by considering the uncertainty data 550.

The image processing apparatus may cause a predicting density field to have a large value at a position near the depth of an actual static object by decreasing and reflecting the weight for a loss of the portion corresponding to the transient object in the image. In addition, when sampling points used to calculate a first error associated with a camera pose, the image processing apparatus may sample points with small uncertainty such that, in a modeling structure, such as NeRF-W, the neural network model may reliably distinguish a static object from a transient object and may be trained to that end.

Figure 6:
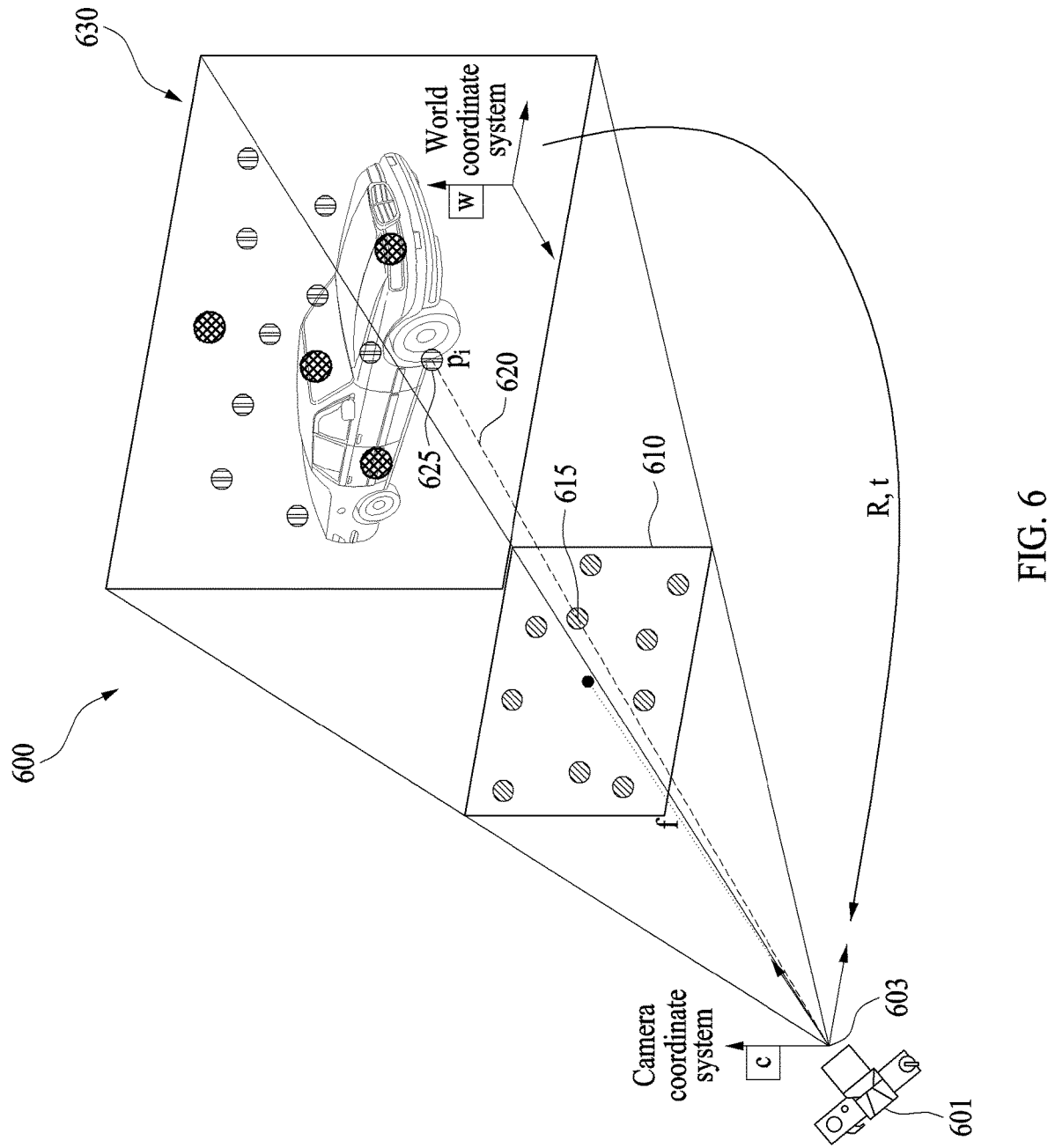
FIG. 6 illustrates an example of a relationship between a two-dimensional (2D) camera coordinate system and a three-dimensional (3D) camera coordinate system, according to one or more embodiments.

FIG. 6 illustrates an example of a relationship between a 2D camera coordinate system and a 3D camera coordinate system, according to one or more embodiments. Referring to FIG. 6, illustrated is a diagram 600 of a process of an image processing apparatus that outputs a rendered image corresponding to a target scene from a camera pose of a camera 601 (virtual) corresponding to the target scene. In this case, the camera pose may have, for example, positions of 3D points on camera rays passing through pixels of an input image from the center of the camera 601, a viewing direction 620 including a position in which the camera 601 views the 3D points for each camera ray and a direction in which the camera 601 views the 3D points, and a first latent vector denoting appearance information of a static object. In this case, the image processing apparatus may estimate a 6DoF camera pose for a query image on coordinates of a known scene. In this case, the camera pose may be referred to as a query input.

In this case, the viewing direction 620 represents a direction passing through points corresponding to a target pixel from a viewpoint; the direction being one in which the image processing apparatus views a 2D scene 610 to be synthesized and/or reconstructed. The 2D scene 610 may be a scene of a 3D space 630 captured at a predetermined time point from a viewpoint 603 at an FOV, and a point 615 of the 2D scene 610 may correspond to a pixel of a 2D image.

In the example of FIG. 6, a position Pi 625 of 3D points on camera rays may include position coordinates (x, y, z) indicating a target point X in the 3D space 630. In addition, the viewing direction 620 may include the viewing direction 620 from the viewpoint 603 toward the target point X. The position coordinates (x, y, z) may be position coordinates according to the Cartesian position coordinate system based on a predetermined origin point, and the viewing direction 620 may be angles formed between the viewing direction 620 and two predetermined reference axes (e.g., the positive direction of the z-axis and the positive direction of the x-axis).

R and t correspond to parameters defining coordinate system conversion (e.g., a transform) from 3D world coordinates to 3D camera coordinates. In addition, the extrinsic parameter (R, t) define a position of the center of the camera 601 and a camera direction in the world coordinates.

t corresponds to a position of the origin point of the world coordinate system expressed as coordinates of a camera-centered coordinate system. A camera position C expressed in the 3D space 630 corresponding to the world coordinate system may be expressed as $C=-R^{-1}T=-R^{r}T$, where R is a rotation matrix.

Herein, the position coordinates (x, y, z) represent position coordinates of a 3D point sampled in the viewing direction 620 in the 3D space 630 of an i-th time frame (e.g., $t_i$). In this case, i may be time information and may be, for example, a vector representing the i-th time frame (e.g., $t_i$).

The training apparatus may randomly sample a camera ray for each training epoch, may obtain a pixel value (e.g., a color) by causing sampled points among 3D points on a determined camera ray to pass through a neural network model, and may calculate a loss or an error by synthesizing pixel values through volume rendering.

The training apparatus may calculate, for example, an objective function value based on an output obtained by forward propagating the i-th time frame (e.g., $t_i$) and a target point with a neural network model. The training apparatus may output color information and density information based on forward propagation of the neural network model. The training apparatus may obtain a pixel value corresponding to a 2D scene image by volume rendering from the color information and the density information. The objective function (e.g., rendering loss) may be, for example, determined based on the difference (e.g., L2 loss) between a pixel value of a ground truth (GT) color image and a temporary pixel value based on forward propagation described above. However, the objective function value is not limited thereto and may vary depending on the design. The training apparatus may update a parameter (e.g., a weight) of the neural network model such that the objective function values vary in a predetermined direction (e.g., in a decreasing direction) based on back propagation.

FIG. 7 illustrates an example method of training a neural network model, according to one or more embodiments.

Referring to FIG. 7, a training apparatus may train a neural network model through operations 710 to 760.

In operation 710, the training apparatus may receive a first camera pose corresponding to a plurality of image frames corresponding to an object included in a training image captured by a 360-degree camera (or, an image synthesized to 360-degree image from other images).

In operation 720, the training apparatus may generate at least one piece of prediction information, which may be information of a color (e.g., a first color) of a point and/or the density (e.g., a first density) of the point. The prediction information may be generated by applying, to the neural network model, each 3D point on camera rays formed based on the first camera pose received in operation 710. The prediction information may further include, for example, the probability that an object corresponds to a transient object, a second color corresponding to the transient object at the point, and/or a second density corresponding to the transient object at the point.

Alternatively, the training apparatus may generate prediction information by further applying, to the neural network model, (i) a first latent vector denoting appearance information of a static object among objects and/or (ii) a second latent vector denoting appearance information of a transient object among objects.

In operation 730, the training apparatus may sample feature points to estimate a second camera pose among the 3D points based on the at least one piece of prediction information generated in operation 720. The training apparatus may sample feature points among the 3D points based on a combination of the density of a point and the probability that the point corresponds to a transient object.

Based on the density of the point, the training apparatus may sample, as a feature point, at least one of 3D points, which have greater density values than a reference value and correspond to a static object, and 3D points adjacent to the 3D points having greater density values than the reference value. Alternatively, the training apparatus may set, to be feature points, 3D points of which accumulated transmittance of the 3D points exceeds a predetermined threshold.

The feature points may be used to calculate a first error based on the difference between camera poses, in operation 730. When sampling the feature points used to calculate the first error, the training apparatus may sample points having small uncertainty, in other words, points corresponding to the static object such that the neural network model may be well trained to distinguish static objects from transient objects.

In operation 730, the training apparatus may calculate the first error based on the difference between the first camera pose received in operation 710 and the second camera pose estimated based on the feature points sampled in operation 730. The first error may be referred to as a geometric error because the first error is based on the difference between camera poses.

The training apparatus may cause a density field predicted by the neural network model to have a great value at a position near the depth of the static object by using the first error.

In operation 740, the training apparatus may calculate a second error based on the difference between an approximated color of an object and a ground truth color corresponding to the object using the piece of prediction information generated in operation 720. The second error may be referred to as a photometric error because the second error is based on a difference between pixel colors.

In operation 750, the training apparatus may train the neural network model based on the first error calculated in operation 730 and the second error calculated in operation 740. Based on the first error and the second error, the training apparatus may train a first latent vector denoting appearance information of a static object among objects included in a training apparatus together with the neural network model. In addition, the training apparatus may adjust the first camera pose received in operation 710 based on the first error and the second error.

Figure 8A:
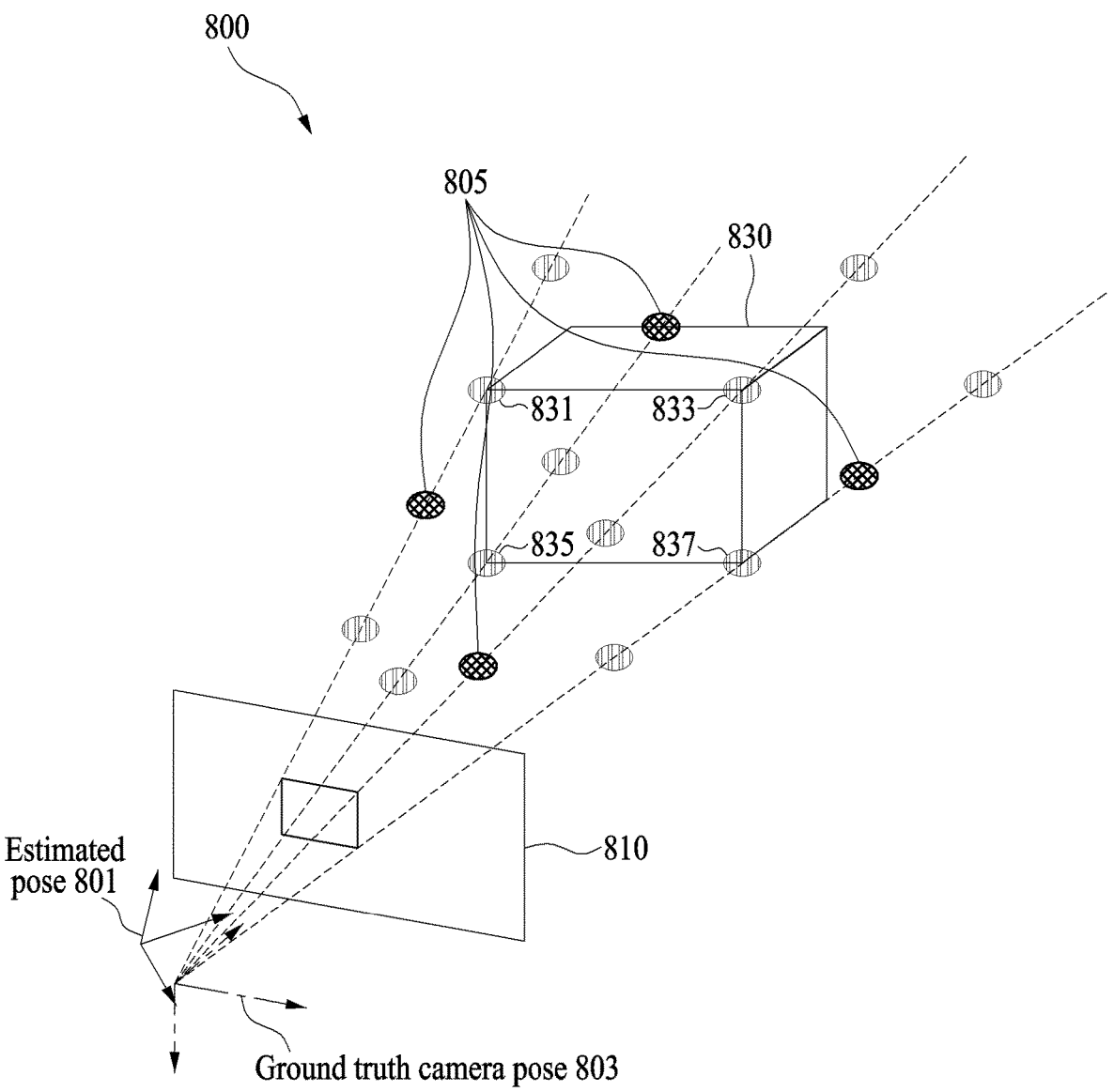
FIGS. 8A to 8C illustrate an example method of sampling target points, according to one or more embodiments.
Figure 8B:
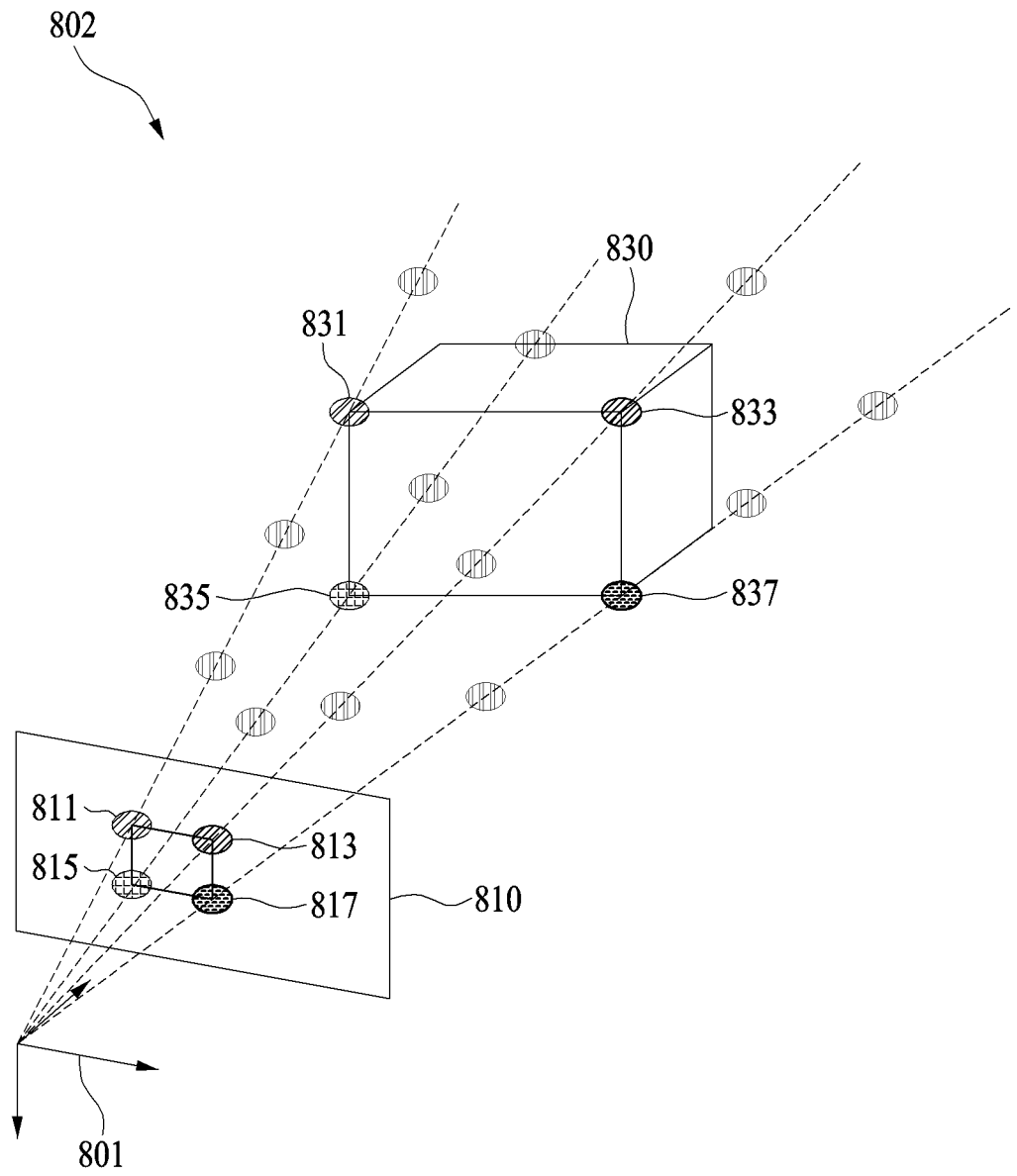
Figure 8C:
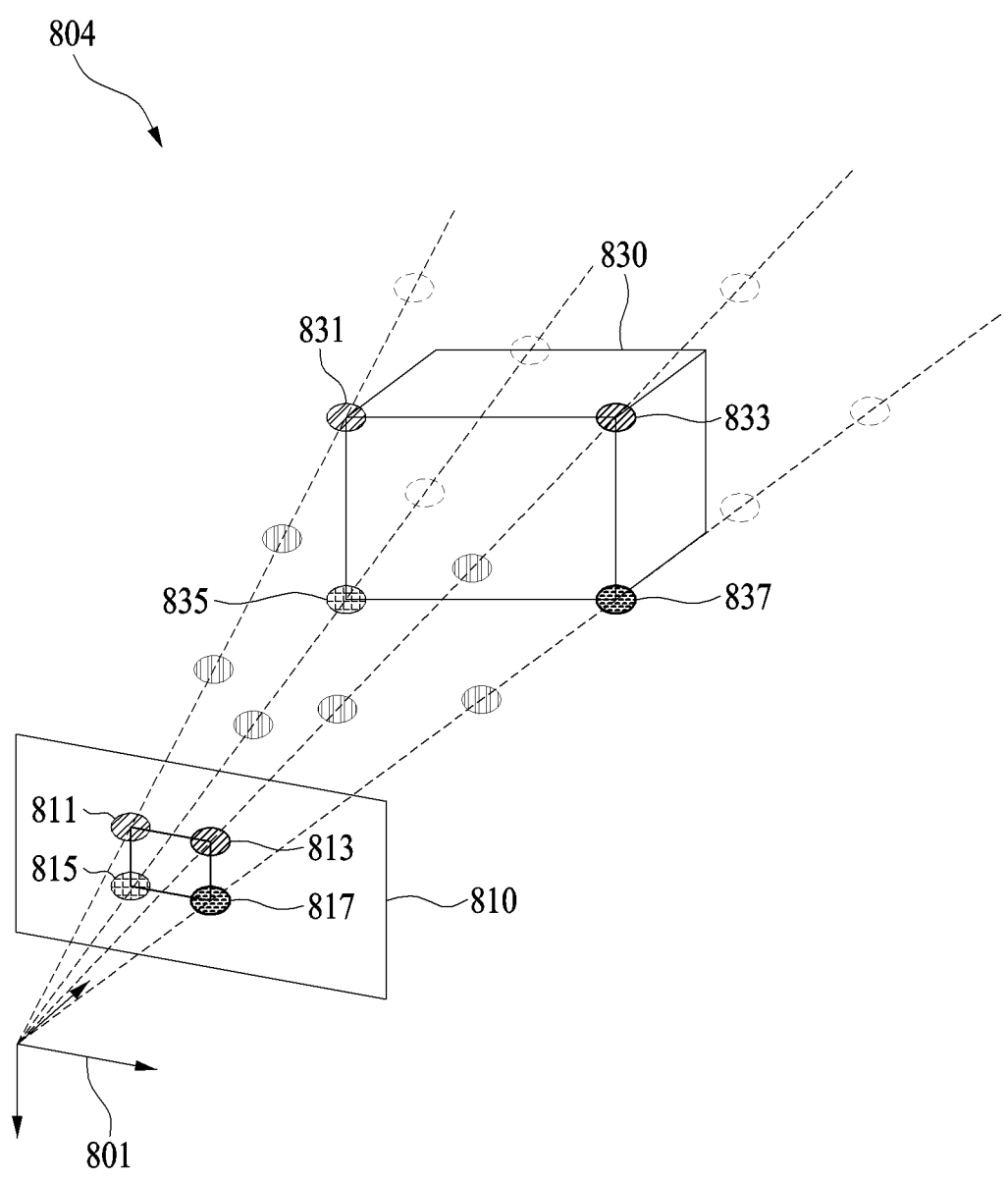

FIGS. 8A to 8C show an example method of calculating a first error by sampling feature points among 3D points to estimate a second camera pose, according to one or more embodiments.

Referring to FIG. 8A, illustrated is a diagram 800 of a sampling method of feature points based on prediction information of a neural network model.

The neural network model may output prediction information (e.g., density and color) corresponding to 3D points on a camera ray formed based on a ground truth camera pose 803. The neural network model may predict the density and color of one of 3D points on a camera ray at a time. For example, when the neural network model predicts densities and colors of four points corresponding to one camera ray, the training apparatus may sample points 805 having the greatest density values predicted for each camera ray. The four sampled points 805 may correspond to a static object 830. A camera pose may be estimated by the four sampled points 805. In this case, a difference between an estimated camera pose 801 and the ground truth camera pose 803 may occur. Due to the difference between the estimated camera pose 801 and the ground truth camera pose 803, positions of the four sampled points 805 corresponding to the estimated camera pose 801 may be different from the positions of 3D points 831, 833, 835, and 837 corresponding to an edge of the static object 830 in a 3D space.

The training apparatus may train the neural network model to minimize the first error corresponding to the difference between positions of the four sampled points 805 corresponding to the estimated camera pose 801 and the positions of the 3D points 831, 833, 835, and 837 corresponding to the edge of the static object 830 such that, as shown in FIGS. 8B and/or 8C, the estimated camera pose 801 may be the same as the ground truth camera pose 803.

Referring to FIG. 8B, illustrated is a diagram 802 showing a sampling method of feature points when the estimated camera pose 801 is the same as the ground truth camera pose 803.

As shown in the diagram 802, when training the neural network model to match the estimated camera pose 801 to the ground truth camera pose 803, the training apparatus may sample the feature points by prediction information (e.g., density and/or uncertainty) generated by the neural network model.

The training apparatus may, for example, sample the feature points among 3D points by densities of corresponding points. The training apparatus may sample the 3D points 831, 833, 835, and 837 having the greatest density values among four points corresponding to each camera ray. In this case, the 3D points 831, 833, 835, and 837 having the greatest density values may correspond to points having a high probability of being points of a static object.

In this case, a 2D scene 810 may be a scene of a static object 830 in a 3D space captured at a predetermined time point from a viewpoint at an FOV and each of points 811, 813, 815, and 817 of the 2D scene may correspond to pixels of a 2D image. A pixel value of the point 811 of the 2D scene may correspond to a pixel value (e.g., an RGB color value of a pixel) of the point 831 having the greatest density value among the four sampled points on a camera ray where the point 811 is positioned. A pixel value of the point 813 may correspond to a pixel value of the point 833 having the greatest density value among the four sampled points on a camera ray where the point 813 is positioned. Similarly, a pixel value of the point 815 may correspond to a pixel value of the point 835 having the greatest density value among the four sampled points on a camera ray where the point 815 is positioned and a pixel value of the point 817 may correspond to a pixel value of the point 837 having the greatest density value among the four sampled points on a camera ray where the point 817 is positioned.

Alternatively, the training apparatus may sample the feature points among the 3D points based on a combination of the density of a corresponding point and the probability (uncertainty) that the corresponding point corresponds to a transient object. The training apparatus may sample the feature points by a result obtained by reflecting a reciprocal $1/\beta$ value of uncertainty in four points corresponding to each camera ray.

The training apparatus may calculate the first error (the difference between the estimated camera pose (the second camera pose) and the ground truth camera pose (the first camera pose)) based on the sampled feature points described above. The training apparatus may train the neural network model to match the estimated camera pose 801 that is estimated as the first error is minimized to the ground truth camera pose 803, in other words, to match the sampled points 805 corresponding to the estimated camera pose 801 to the 3D points 831, 833, 835, and 837 corresponding to the edge of the static object 830.

The training apparatus may calculate the second error based on the difference between a ground truth color corresponding to the static object and an approximated color of the static object obtained by the weighted sum of colors of sampled feature points. In this case, a 2D scene 810 may be a scene of a static object 830 in a 3D space captured at a predetermined time point from a viewpoint at an FOV and each of points 811, 813, 815, and 817 of the 2D scene may correspond to a pixel of a 2D image. Pixel values of the points 811, 813, 815, and 817 may be pixel values of four sampled points on each camera ray where each of the points 811, 813, 815, and 817 is positioned, in other words, the weighted sum of color values of pixels.

According to an example, as shown in a diagram 804 of FIG. 8C, the training apparatus may sample feature points based on 3D points corresponding to the static object, wherein the 3D points have greater density values than a reference value among 3D points on a camera ray formed based on the estimated camera pose.

The training apparatus may exclude 3D points (marked with dashed lines), where the 3D points are out of positions of the 3D points 831, 833, 835, and 837 corresponding to the static object on the camera ray and may sample, as feature points, 3D points that are within positions of the 3D points 831, 833, 835, and 837.

In this case, a pixel value of the point 811 of the 2D scene 810 may be the weighted sum of pixel values of three sampled points on a camera ray where the point 811 is positioned and a pixel value of the point 813 may be the weighted sum of pixel values of three sampled points on a camera ray where the point 813 is positioned. In addition, a pixel value of the point 815 may be the weighted sum of pixel values of two sampled points on a camera ray where the point 815 is positioned and a pixel value of the point 817 may be the weighted sum of pixel values of two sampled points on a camera ray where the point 817 is positioned.

During iterative training processes of the neural network model, when densities of 3D points, which are preferentially obtained, are greater than a threshold (e.g., a density value corresponding to a static object), the training apparatus may infer colors of 3D points existing within positions of the 3D points 831, 833, 835, and 837 corresponding to the static object without considering 3D points obtained thereafter and weighted-sum the colors of the inferred 3D points.

Alternatively, the training apparatus may sample the 3D points 831, 833, 835, and 837 having the greatest density values and 3D points adjacent to the 3D points 831, 833, 835, and 837 as feature points. The training apparatus may sample 3D points more densely in a region adjacent to the 3D points 831, 833, 835, and 837 having the greatest density values.

The training apparatus may calculate the second error based on the difference between a ground truth color corresponding to the static object and an approximated color of the static object obtained by the weighted sum of colors of sampled feature points described above. The training apparatus may train the neural network model to minimize the first error and the second error.

The sampling method of feature points used to estimate a camera pose in the training process of the neural network model described with reference to FIGS. 8B and 8C may be applicable in the same manner to a process of sampling target points for rendering in an inference process performed using the trained neural network model.

Figure 9:
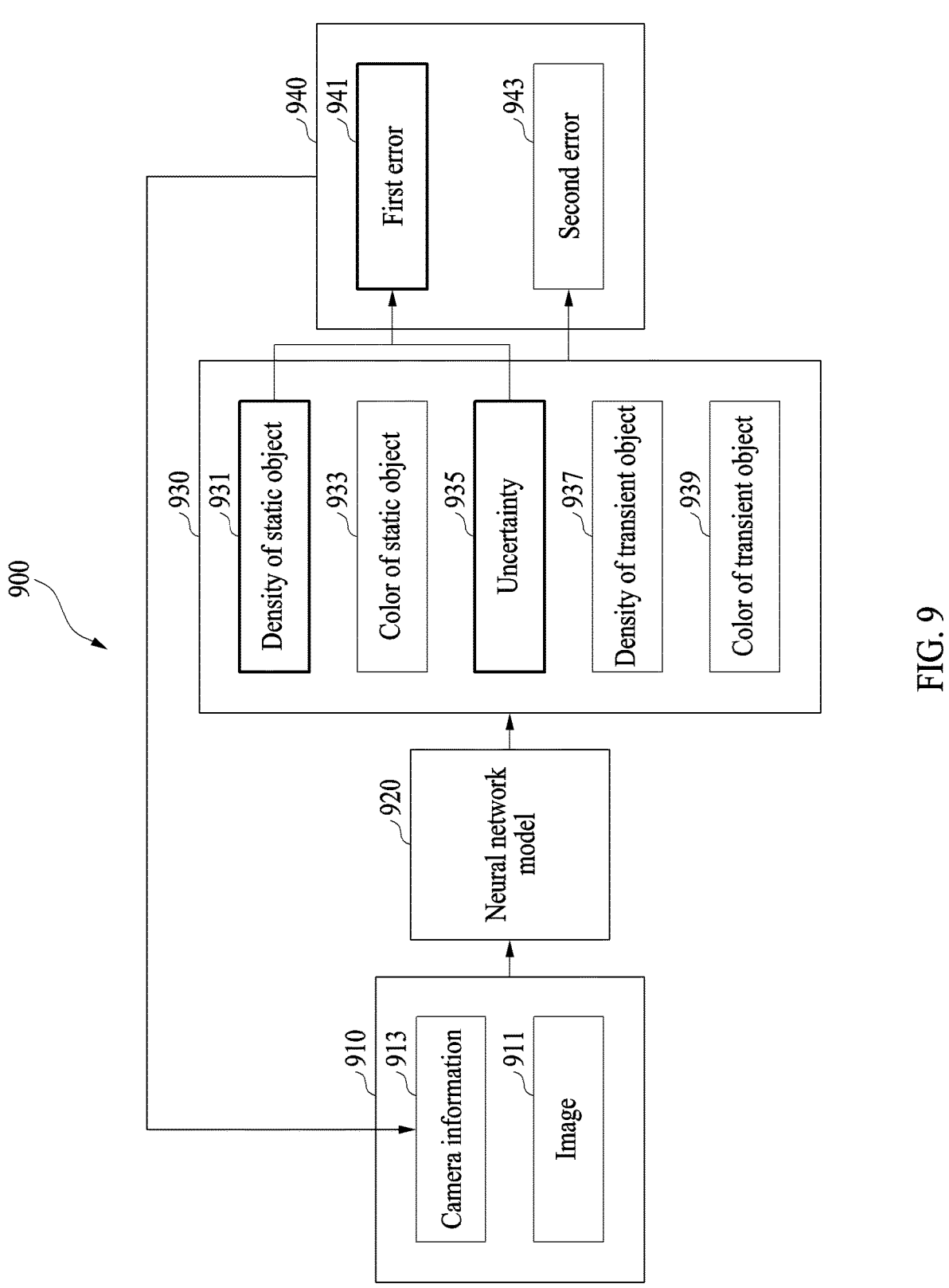
FIG. 9 illustrates an example training structure and training method of a neural network model, according to one or more embodiments.

FIG. 9 illustrates an example training structure and training method of a neural network model, according to one or more embodiments. Referring to FIG. 9, a diagram 900 shows a training structure and a training method of a neural network model 920.

When input data 910 including a training image 911 and camera information 913 on a target scene is given, the training apparatus may train the neural network model 920 to be able to predict the density, a color, and uncertainty of an object including a static object and a transient object included in the training image 911.

The training image 911 may be, for example, a plurality of image frames corresponding to an object included in a training image captured by a 360-degree camera. However, the example is not limited thereto.

The camera information 913 may further include an intrinsic parameter and an extrinsic parameter of a camera other than a 5DoF camera pose or a 6DoF camera pose described above. The intrinsic parameter may include, for example, a focal length f, a principal point, and/or a skew coefficient. The extrinsic parameter may correspond to a parameter describing a conversion (transform) relationship between a camera coordinate system and a world coordinate system and may be expressed as rotation R and translation t conversion between the two coordinate systems.

The training apparatus may receive the training image 911 and the camera information 913 including a first camera pose corresponding to the training image 911 as the input data 910.

The training apparatus may generate a piece of prediction information including colors 933 and 939 of a point, densities 931 and 937 of the point, and/or the probability (uncertainty) 935 that the point corresponds to a transient object, and may do so by applying, to the neural network model 920, each of 3D points on camera rays formed based on the first camera pose corresponding to the training image 911. In this case, the training apparatus may further apply, to the neural network model 920, a first latent vector denoting appearance information of a static object among objects and/or a second latent vector denoting appearance information of a transient object among objects.

The neural network model 920 may be, for example, the neural network model 120 described with reference to FIG. 1 or the neural network model 400 described with reference to FIG. 4.

The training apparatus may sample feature points of the 3D points based on a combination of the density of the point (e.g., the density 931 of the static object) and the probability 935 that the point corresponds to the transient object among the at least one piece of prediction information. The training apparatus may estimate (calculate) a second camera pose by the sampled feature points by reflecting uncertainty in points corresponding to the static object. The training apparatus may calculate a first error 941 by the difference between the second camera pose estimated by the sampled feature points and the first camera pose corresponding to the plurality of image frames.

In addition, the training apparatus may calculate the second error 943 based on the difference between an approximated color of an object and a ground truth color of the object using the piece of prediction information 930.

The training apparatus may train the neural network model 920 by a loss 940 including the first error 941 and the second error 943. The training apparatus may train the neural network model 920 by assigning different weights to the first error 941 and the second error 943. The training apparatus may update the neural network model 920 by adjusting the weight of the neural network model 920 to minimize the loss 940.

In addition, the training apparatus may adjust the first camera pose by the loss 940 based on the first error 941 and the second error 943. The training apparatus may train the neural network model 920 to consider the uncertainty of camera information by using the loss 940 to adjust the camera information 913.

For example, to estimate a 6DoF camera pose for a query image on coordinates of a known scene, 3D coordinates of a point of a scene corresponding to a position of a 2D pixel in each image frame may be used. When the correspondence relationship between a position of a 2D pixel and coordinates of a 3D scene is given, a camera pose including rotation R and translation t of a camera on 3D coordinates of the scene may be estimated through perspective-n-point (PnP).

By applying the camera pose estimation concept described above to an approaching method of modeling density and color as NeRF, a density field may have greater values at positions near the depth of an actual static object.

For example, when training the neural network model 920 having the same structure as the neural network model 120 or the neural network model 400, the training apparatus may determine a pixel position on a 3D point passing through a camera ray by densities and color information of points of the camera ray.

In this case, because a coordinate value corresponding to a 3D point for each 2D pixel is used to calculate the camera pose, the training apparatus may train the neural network model 920 by selecting or sampling one of a plurality of points on a camera ray. As the accuracy of a depth value corresponding to the point selected by the training apparatus increases, a more accurate camera pose may be calculated.

For example, the training apparatus may select or sample a 3D point (a feature point) to be used in calculation of a camera pose among the plurality of 3D points on a camera ray based on the following criteria.

The training apparatus may select a feature point to be (1) 3D points of which densities are greater than a predetermined reference, where the 3D points correspond to the static object and the probability that the 3D point corresponds to a transient object is greater than a threshold. In addition, the training apparatus may select a feature point to be (2) 3D points of which accumulated transmittance of the 3D points exceeds a predetermined threshold or 3D points of which densities exceed a predetermined threshold, where the 3D points correspond to an object. In this case, the transmittance may correspond to a reciprocal of densities of the 3D points.

By adding, to the loss 940, the first error 941 based on the difference between an estimated camera pose (the second camera pose) and a ground truth camera pose (the first camera pose) by information obtained by the neural network model 920, the training apparatus may cause the neural network model 920 to learn a predicted density and uncertainty of a static object better as well as may improve the quality of a rendered image corresponding to an image synthesis result.

The neural network model 920 trained as described above may have a distinct characteristic that a density field has greater values at predetermined points (e.g., points corresponding to a static object) and may thus decrease the amount of computations by decreasing the number of points that perform volume rendering in an inference process.

Figure 10:
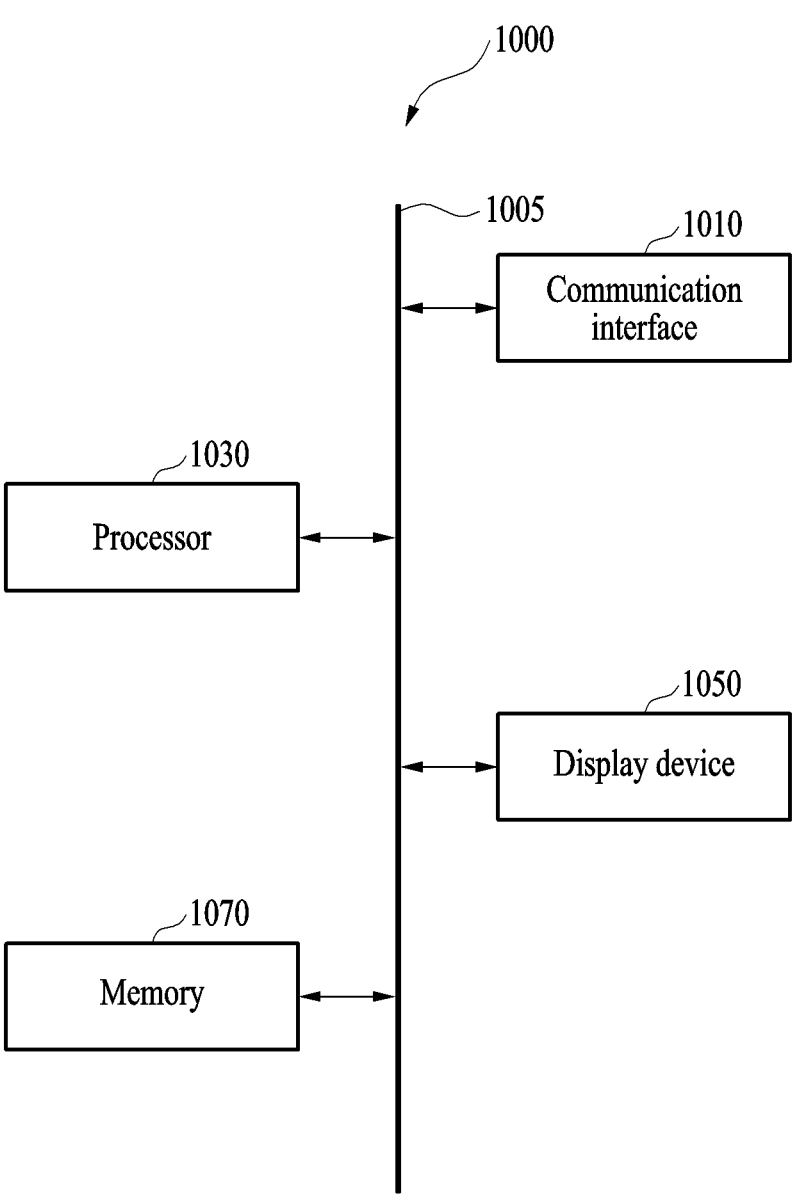
FIG. 10 illustrates an example image processing apparatus, according to one or more embodiments.

FIG. 10 illustrates an example of an image processing apparatus. Referring to FIG. 10, an image processing apparatus 1000 may include a communication interface 1010, a processor 1030, a display device 1050, and a memory 1070. The communication interface 1010, the processor 1030, the display device 1050, and the memory 1070 may connect to one another via a communication bus 1005.

The communication interface 1010 may receive a camera pose of a camera corresponding to a target scene.

The processor 1030 may generate at least one piece of prediction information of a color of an object included in a target scene and the density of the object by applying 3D points on a camera ray that is formed based on the camera pose received through the communication interface 1010 to a neural network model. The processor 1030 may sample target points corresponding to a static object among 3D points based on at least one piece of prediction information. The processor 1030 may output a rendered image corresponding to a target scene by projecting a pixel value corresponding to target points onto the target scene and rendering the target scene onto which the pixel value is projected.

The display device 1050 may display the rendered image output by the processor 1030.

The processor 1030 may execute a program and control an image processing apparatus 1000. Program code to be executed by the processor 1030 may be stored in the memory 1070.

The memory 1070 may store a neural network model that generates at least one piece of prediction information of a color of an object included in the target scene and the density of the object. For example, as a target scene and a camera pose are input to the neural network model, the neural network model may be trained to output a color of a pixel related to a 3D point, a density corresponding to the 3D point, and the probability in which the 3D point corresponds to a transient object, wherein the 3D point corresponds to an object among 3D points in a target scene.

The memory 1070 may also store at least one program and/or a variety of information generated in a processing process of the processor 1030. In addition, the memory 1070 may store a variety of data and programs. The memory 1070 may include volatile memory or non-volatile memory. The memory 1070 may include a large-capacity storage medium such as a hard disk to store a variety of data.

In addition, the processor 1030 may perform at least one method described with reference to FIGS. 1 to 9 or a scheme corresponding to the at least one method. The processor 1030 may be, for example, a mobile application processor (AP) but is not necessarily limited thereto. Alternatively, the processor 1030 may be an image processing device implemented by hardware including a circuit having a physical structure to perform desired operations. For example, the desired operations may include code or instructions included in a program. The image processing apparatus 1000 may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The computing apparatuses, the electronic devices, the processors, the memories, the displays, the information output system and hardware, the storage devices, and other apparatuses, devices, units, modules, and components described herein with respect to FIGS. 1-10 are implemented by or representative of hardware components.

Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RW, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, in addition to the above disclosure, the scope of the disclosure may also be defined by the claims and their equivalents, and all variations within the scope of the claims and their equivalents are to be construed as being included in the disclosure.

What is claimed is:

1. An image processing method comprising:
   receiving a camera pose of a camera corresponding to a target scene;
   generating a piece of prediction information comprising either a color of an object comprised in the target scene or a density of the object, wherein the prediction information is generated by applying, to a neural network model, three-dimensional (3D) points on a camera ray formed based on the camera pose;
   sampling, among the 3D points, target points corresponding to a static object, wherein the sampling is based on the piece of prediction information and uncertainty data indicating a probability that a respective 3D point in the target scene corresponds to a transient object; and
   outputting a rendered image corresponding to the target scene by projecting a pixel value corresponding to the target points onto the target scene and rendering the target scene onto which the pixel value is projected.

2. The image processing method of claim 1, wherein the generating of the piece of prediction information comprises applying a first latent vector denoting appearance information of the static object to the neural network model.

3. The image processing method of claim 1, wherein the sampling of the target points comprises:
   based on the density of the object, setting, to be the target points, those of the 3D points that correspond to the static object and that have respective density values greater than a reference value.

4. The image processing method of claim 1, wherein the sampling of the target points comprises:
   based on the density of the object, setting, to be the target points, (i) those of the 3D points that correspond to the static object and that have respective density values greater than a reference value among the 3D points and (ii) those of the 3D points that are adjacent to the 3D points having density values greater than the reference value.

5. The image processing method of claim 1, wherein the sampling of the target points comprises sampling the target points among the 3D points based on a combination of the density of the object and a probability that the object corresponds to the transient object in the scene.

6. The image processing method of claim 1, wherein the sampling of the target points comprises setting, to be the target points, those of the 3D points for which accumulated transmittance thereof exceeds a threshold.

7. The image processing method of claim 1, wherein the camera pose comprises:
   positions of the 3D points on camera rays passing from a center of the camera and through pixels of the target scene;
   a position of the camera viewing the 3D points for each of the camera rays; and
   a direction in which the camera views the 3D points.

8. The image processing method of claim 1, wherein the neural network model is trained to output, as a target scene and a camera pose are input to the neural network model, a color of a pixel related to a 3D point, a density corresponding to the 3D point, and a probability that the 3D point corresponds to the transient object, wherein the 3D point is a 3D point, among the 3D points in the target scene, that corresponds to the object.

9. The image processing method of claim 1, wherein the outputting of the rendered image further comprises:

projecting, onto the target scene, a color of a pixel corresponding to the camera ray and a density determined for each position of the target points, and rendering the target scene onto which the density and the color of the pixel are projected, wherein the color of the pixel and the density are determined by applying each position of the target points to the neural network model.

10. The image processing method of claim 1, wherein the outputting of the rendered image comprises:

iteratively projecting, onto the target scene, a color of a pixel determined for each position of the target points and a density determined for each position of the target points, and rendering the target scene onto which the density and the color of the pixel are iteratively projected.

11. A method of training a neural network model for image processing, the method comprising:

receiving a first camera pose corresponding to each of image frames corresponding to an object comprised in a training image captured by a 360-degree camera;

generating at least one piece of prediction information of a color of a 3D point and a density of the 3D point by applying, to the neural network model, each three-dimensional (3D) point on camera rays formed based on the first camera pose;

sampling feature points to estimate a second camera pose, wherein the feature points are sampled from among 3D points on the camera rays based on a piece of prediction information;

calculating a first error based on a difference between the first camera pose and the second camera pose;

calculating a second error based on a difference between a ground truth color corresponding to the object and an approximated color of the object that is approximated using the piece of prediction information; and training the neural network model based on the first error and the second error.

12. The method of claim 11, wherein the piece of prediction information comprises a probability that the object corresponds a transient object, a second color corresponding to the transient object at the 3D point, and a second density corresponding to the transient object at the 3D point.

13. The method of claim 11, wherein the sampling of the feature points is based on a combination of the density of the 3D point and a probability that the 3D point corresponds to a transient object.

14. The training method of claim 11, wherein the sampling of the feature points comprises:

based on a density of a corresponding point, sampling, as the feature points, either:

a 3D point having a greatest density value among the 3D points, 3D points having greater density values than a reference value among the 3D points, and/or 3D points adjacent to 3D points having greater density values than the reference value.

15. The method of claim 11, wherein the sampling of the feature points comprises setting, to be the feature points, 3D points of which accumulated transmittance of the 3D points exceeds a predetermined threshold.

16. The method of claim 15, wherein the generating of the at least one piece of prediction information comprises applying, to the neural network model, a first latent vector denoting appearance information of a static object of the object and/or a second latent vector denoting appearance information of the transient object of the object.

17. The method of claim 11, wherein the training comprises training a first latent vector together with the neural network model based on the first error and the second error.

18. The method of claim 11, further comprising adjusting the first camera pose based on the first error and the second error.

19. A non-transitory computer-readable storage medium storing instructions that, when executed by a processor, cause the processor to perform the method of claim 1.

20. An image processing apparatus comprising:

one or more processors;

memory storing instructions configured to cause the one or more processors to:

generate a piece of prediction information predicting a color of an object comprised in a target scene or a density of the object, wherein the piece of prediction information is generated by applying, to a neural network, three-dimensional (3D) points on a camera ray formed based on a camera pose, sample target points corresponding to a static object among the 3D points based on the piece of prediction information and uncertainty data indicating a probability that a respective 3D point in the target scene corresponds to a transient object, and output a rendered image corresponding to the target scene by projecting a pixel value corresponding to the target points onto the target scene and rendering the target scene onto which the pixel value is projected.

* * * * *